United States Patent

[11] 3,617,836

| [72] | Inventor | Donald E. Henry |
| | | Davenport, Iowa |
| [21] | Appl. No. | 749,558 |
| [22] | Filed | July 18, 1968 |
| [45] | Patented | Nov. 2, 1971 |
| [73] | Assignee | Gulf & Western Industries |
| | | New York, N.Y. |

[54] CONTROL CIRCUIT FOR SYNCHRONOUS MOTOR
11 Claims, 4 Drawing Figs.

[52] U.S. Cl. .................................................. 318/171,
307/202, 317/13, 318/227, 318/434
[51] Int. Cl. ..................................................... H02p 5/34
[50] Field of Search.......................................... 318/171,
189, 341, 227, 434, 228–231; 307/202; 317/13;
333/20

[56] References Cited
UNITED STATES PATENTS

| 2,415,405 | 2/1947 | Barney ......................... | 318/171 |
| 3,243,677 | 3/1966 | Cannalte et al. ............... | 318/231 |
| 3,343,063 | 9/1967 | Keeney, Jr. et al. .......... | 318/341 |
| 3,351,835 | 11/1967 | Borden et al. ................. | 318/227 |
| 3,409,814 | 11/1968 | Azuma et al. .................. | 318/341 |

*Primary Examiner*—Oris L. Rader
*Assistant Examiner*—K. L. Crosson
*Attorney*—Meyer, Tilberry and Body ABSTRACT: A control circuit is disclosed herein for applying signals to an inductive load, such as the winding of a synchronous motor. The circuit includes means for producing essentially a square wave signal together with a capacitor for coupling the signal to the inductive load. The average current impressed across and, hence, power consumed by the inductive load is limited by the capacitor in such a manner to prevent destruction of the inductive load at low frequencies.

INVENTOR
DONALD E. HENRY

BY
Meyer, Tilberry & Body
ATTORNEYS

INVENTOR.
DONALD E. HENRY

BY
Meyer, Tilberry & Body
ATTORNEYS

CONTROL CIRCUIT FOR SYNCHRONOUS MOTOR

This invention relates to a control circuit and, more particularly, to a nonlinear amplifier control circuit which is operable in a switching mode to supply power to a synchronous motor.

Heretofore, linear power amplifiers were heavily relied upon to supply sufficient power to drive synchronous motors. Such linear amplifiers require considerable amount of hardware, such as high power transistors or vacuum tubes in the output state thereof, and large and costly power transformers for coupling the amplifier to the synchronous motor. As a result, distortion is reflected back into the amplifier. Also, a linear amplifier can control the speed of a synchronous motor only over a limited range because of the gain-band width necessary to drive the motor. It is well known, for example, that the speed of a synchronous motor may be changed by changing the frequency of its energizing voltage. However, the inductive reactance of the motor varies in proportion to the frequency, so that with a constant supply amplitude, the motor tends to draw more current with a decrease in frequency, thus presenting problems at the lower frequencies. Therefore, some means of generating a gain versus frequency characteristic is required to maintain the average current supplied to the motor constant over a range of frequencies to prevent the synchronous motor from burning up at the lower operating frequencies of such linear amplifiers. Since the starting torque of a synchronous motor is also a function of frequency, it is necessary to maintain the average current supplied to the motor constant over these lower frequencies if constant motor torque is to be maintained.

In present electronic systems where a variable-speed synchronous motor drive is used, it is often convenient to operate synchronous motors from DC supplies. In such instances, the motor is driven by trigger-switching circuits using pulses of a constant duty cycle and a changing of a repetition rate of the triggering pulses applied to the system. However, as the pulse repetition rate of the system is changed, pulse amplitude must also be varied and/or power dissipated so that constant average current can be maintained. Heretofore, the power supply circuitry required to accomplish the above result in such systems has been inefficient and complex.

It is, therefore, desirable to provide a system wherein constant average current may be drawn by a variable-speed synchronous motor from a fixed DC supply over the wide switching ranges used so that a simple unregulated DC supply can be used and the inefficiency associated with the aforementioned variable-voltage supply is eliminated. Also, it is desirable to eliminate the need of large and costly components, such as transformers and high-power transistors, when coupling DC current pulses of alternating polarity from such DC supplies to the synchronous motor being powered.

The present invention provides these advantages through the use of a nonlinear amplifier control circuit whose output stage acts as a switch, thus having very small power dissipation as compared to that of prior art linear amplifiers. The need for large transformers or high-powered transistors ordinarily required to drive the synchronous motor is eliminated by the disclosed invention, and the bandwidth of the control circuit is wide enough to drive the motor to its limit of speed. Starting torque for the motor remains nearly constant over the wide operating frequency range of the circuit because of the type of motor control circuit employed in this invention. Also, construction of the nonlinear amplifier circuit of this invention is considerably simpler than that of the prior art circuits.

Typical of the extensive use to which control circuits of the disclosed invention are employed can be seen in traffic control systems as disclosed by U.S. Pat. No. 3,375,492, entitled "-Frequency Generator," filed Sept. 1, 1964, and assigned to the same assignee of this invention. Such systems employ a traffic computer to generate a voltage signal of a magnitude to reflect the characteristic of traffic flow of the area or highway to be controlled. A master controller generates a cycle length carrier signal in relation to the magnitude of the generated voltage signal. This cycle length carrier signal is composed of a plurality of trains of mark and space portions of equal time duration, designating a selected frequency within a range of 40 to 120 cycles per second, the mark portions containing a plurality of count pulses so as to designate what the desired frequencies should be. This carrier signal is amplified for transmission, either by wire or otherwise, to a plurality of local control circuits, similar to what is disclosed by this invention, to cause operation of a local controller motor. The means employed for generating such a carrier signal is fully detailed in the aforementioned United States patent.

In accordance with the present invention there is provided a control circuit for applying signals to an inductive load, such as the winding of a synchronous motor. The circuit includes means for providing essentially a square wave signal which is coupled through a capacitor to the inductive load. The average current impressed across and, hence, power consumed by the inductive load is limited by the capacitor in such a manner to prevent destruction of the inductive load at low frequencies.

Accordingly, it is the primary object of this invention to provide an improved control circuit for a synchronous motor.

It is a further object of this invention to provide a control circuit wherein the current for a synchronous motor is drawn from a fixed DC supply.

It is a further object of this invention to provide a control circuit wherein the current drawn by a synchronous motor from a fixed DC supply is substantially constant over a wide frequency range.

It is a further object of this invention to provide a control circuit that is of simple construction.

It is a further object of this invention to provide a control circuit including a nonlinear amplifier so as to eliminate the need of large and costly components.

It is a further object of this invention to provide a control circuit that uses triggered electronic switching, thus eliminating the need for high-powered transistors.

It is a further object of this invention to provide a control circuit for operation with a traffic control system, operating in a frequency range of 40 to 120 cycles per second.

It is a further object of this invention to provide a control circuit for demodulating an intelligence envelope from a carrier signal which includes a plurality of trains of mark-space pulses.

These and other objects and advantages of this invention will become apparent from the following description of a specific example embodying the invention and the attached claims when taken in conjunction with the accompanying drawings illustrating the described specific example embodying the invention in which:

GENERAL DESCRIPTION

Figure 1:
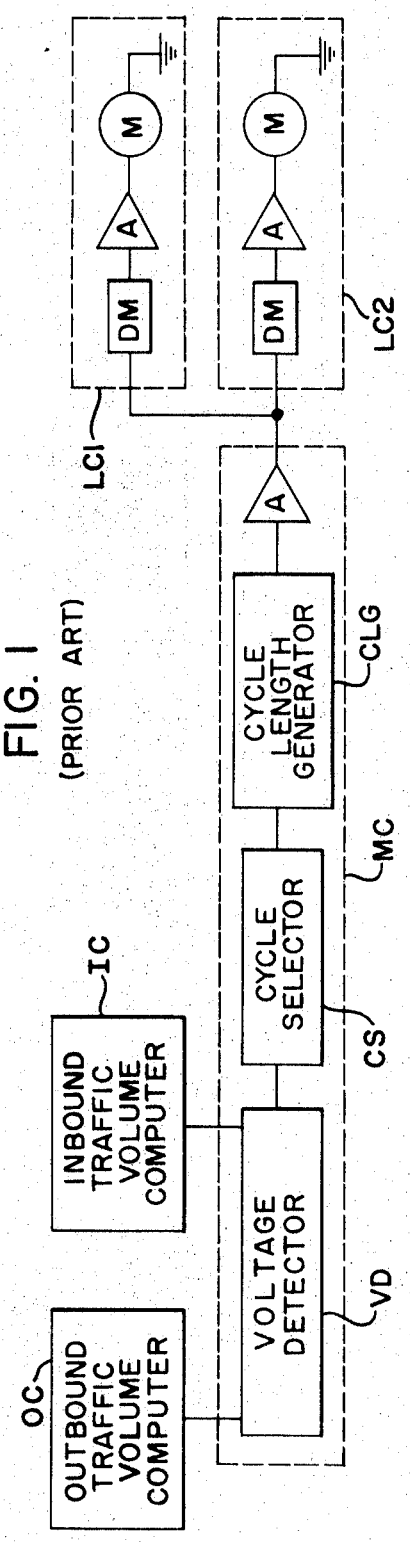
FIG. 1 is a schematic illustration of a master controller and a pair of local controllers within a traffic control system.

Referring now to the drawings which are for the purpose of illustrating a preferred embodiment of the invention and not for the purpose of limiting the same, a prior art traffic control system illustrating a master controller and a pair of local controllers is schematically shown in FIG. 1.

The control system illustrated in FIG. 1 is of the type shown and fully described in U.S. Pat. No. 3,375,492, entitled "-Frequency Generator," and assigned to the assignee of this invention.

Generally, the traffic control system depicted in FIG. 1 has a master controller MC for developing a cycle length determining signal, the signal exhibiting frequencies, in the range of 40 to 120 cycles per second. Signal controller LC1 is responsive to the frequency of the cycle length determining signal for controlling traffic signals at an intersection during each traffic signal cycle. The cycle length is determined by the time it takes synchronous motor M to complete one revolution and this time is inversely proportional to the frequency of the cycle length determining signal.

The length of the traffic signal cycle may be constant or programmed for different cycle lengths at different times of the day to provide a smooth progression of traffic. It is also desirable to synchronize such signals with the input powerline frequency, 60 cycles AC.

The cycle length determining signal of a system such as is shown in FIG. 1 is based on several factors, i.e., flow of inbound traffic and flow of outbound traffic, with the greater traffic flow determining the cycle length, or on a predetermined pattern established from traffic counts or other estimates.

Traffic flow computers, such as OC and IC in FIG. 1, are designed to receive signals from lane detectors (not shown) so as to develop a signal potential proportional to a characteristic of traffic flow along a highway. A traffic flow detector VD in master controller MC passes the signal potential from either computer OC or IC, whichever is of the higher potential, thus selecting the signal potential that is characteristic of the heavier traffic flow in one of the two directions.

A cycle selector CS measures the strength of amplitude of a signal potential passed by detector VD, generating an output signal from one of several levels so as to set the cycle length of the traffic signal.

A cycle length generator CLG generates traffic cycle length determining signals of various frequencies dependent upon the level of signals detected by cycle selector CS. These frequency signals are carried as an envelope of a carrier signal (as shown in FIG. 4A) containing a plurality of trains of mark and space portions, each portion made equal to the other, with the mark portions comprised of alternating pulses of a fixed frequency, such as 1,920 cycles per second. The intelligence is carried by the envelope waveform, in the range of 40 to 120 cycles per second. The method of generating such carrier signal is more detailed in the indicated U.S. Pat. No. 3,375,492, and, therefore, will not be further detailed in this discussion.

The carrier signal produced by cycle length generator CLG is amplifier by amplifier A for transmission, either over wire or otherwise, to energize preferably a multiple of local controllers, such as LC1 and LC2, although it should be appreciated that any number of such local controllers could be so energized.

Figure 3:
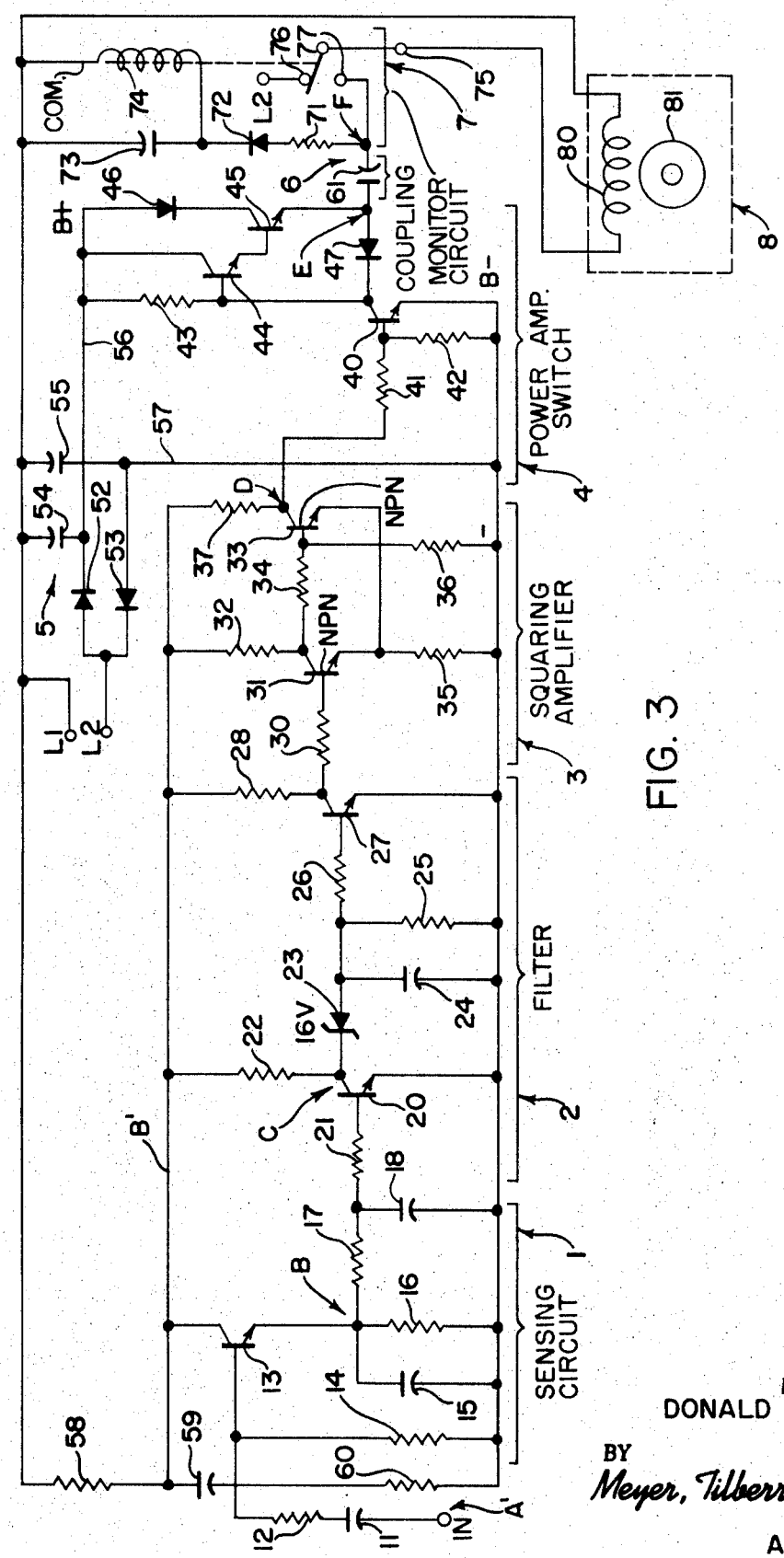
FIG. 3 is a schematic circuit illustrating the preferred embodiment of the present invention; and, FIG. 4 graphically illustrates wave forms of various signals at points $a, b, c, d, e$ and $f$ in FIG. 3.
Figure 4:
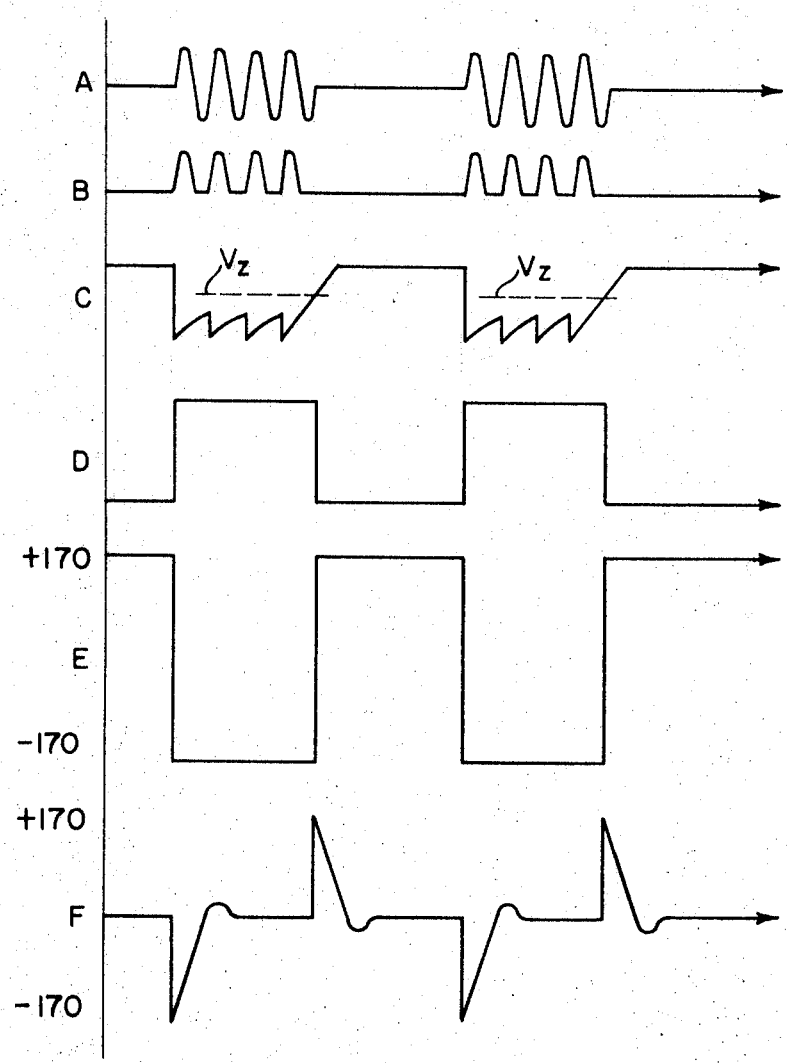

Typically, such local controllers LC1 and LC2 are comprised of a demodulator DM separating the intelligence waveform from the carrier signal, amplifying the intelligence waveform by amplifier A so as to power a traffic signal drive motor M. It is a local controller circuit, usable in such a system as depicted in FIG. 1, with which the invention of this disclosure is concerned. Such a controller circuit is illustrated in FIGS. 2 through 4, and the remaining discussion will be directed to such controller circuit.

LOCAL CONTROLLER

Figure 2:
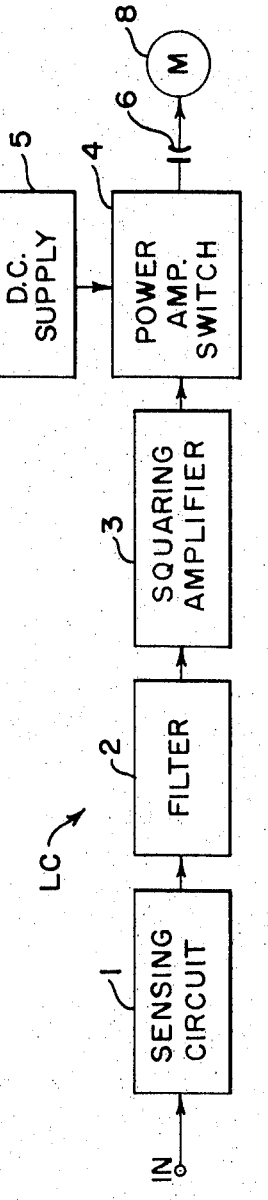
FIG. 2 is a block diagram of the local controller circuit of this invention, for use in a traffic control system as illustrated in FIG. 1.

Referring now to FIG. 2, a cycle length determining signal is adapted to be brought into the local control circuit LC at an input IN. This input signal could be a sine wave or a square wave input signal, but the end result would be the same. As stated previously, the contemplated usable frequency of such signal should fall within the 40–120 cycle per second range. Such a frequency range is considered a wide range for energizing synchronous motors, such motors normally operating at a line frequency of 60 cycles per second.

A sensing circuit 1 provides the required input impedance for the control circuit LC, also removing an AC component from the carrier signal. The rectified carrier signal is fed into a filter 2 wherein the intelligence envelope, in the form of a substantially square wave, is separated from the rectified carrier signal, producing a wave form having a frequency dependent upon the mark pulses and the time lapse between successive mark pulses.

A squaring amplifier 3 squares up the intelligence envelope from filter 2, amplifying the square wave so as to be suitable for fast switching of any unit which may be attached thereto. Such a unit is a power amplifier switch 4 composed of a plurality of power amplifiers operating as a switching unit, for passing a wave of high alternating pulses, at the set frequency, from a DC supply 5 in a direct response to the amplified square wave from squaring amplifier 3. The waveform of the high alternating pulses are of the order of plus 170 and minus 170 volts.

The waveform of high alternating pulses from DC supply 5 passed by power switch 4 are fed to a capacitor 6, where such waveform of pulses are changed to a waveform of high-voltage spiked pulses, thus limiting the current impressed upon an attached load. Such a load is a synchronous motor 8 and the current passed to such motor is suitably limited so as not to destroy the motor at the lower controller operating frequencies within the previously indicated range.

Now referring to FIG. 3, the local control circuit LC of this invention is shown schematically, wherein a single phase synchronous motor is being controlled. The individual components will be set out in the details that follows.

SENSING CIRCUIT

Sensing circuit 1, in the form of an emitter follower, is fed the aforementioned carrier signal at input IN through a series circuit consisting of a capacitor 11 and a resistor 12, into the base of an NPN transistor 13. A base-biasing resistor 14 connects the base of the transistor to B−, which in this embodiment is minus 170 volts. The collector of transistor 13 is wired directly to a line designated as B′, whereas the emitter of the transistor is connected to B− through a parallel circuit consisting of capacitor 15 and resistor 16.

Connected to the emitter of transistor 13, at a point designated as B, is an output circuit in the form of a series circuit, which is also wired to B−, the series output circuit includes a resistor 17 and a capacitor 18, with the free plate of capacitor 18 wired to B−. Point B indicates the junction where the rectified carrier waveform B of FIG. 4 appears. The output of sensing circuit 1 is at the junction of resistor 17 and capacitor 18 and such point is connected to the input of filter 2.

FILTER

Filter 2 includes a resistor 21 serving as the input thereto, with one terminal of the resistor connected to the output of sensing circuit 1 and the other terminal connected to the base of an NPN transistor 20. The emitter of transistor 20 is connected directly to B−, whereas the collector of the transistor is wired to B′ through a load resistor 22.

At a point C (indicating the junction where partially filtered signal C is shown in FIG. 4), a Zener diode 23 connects the collector of transistor 20 to B− through a parallel circuit consisting of a capacitor 24 and a resistor 25 with the anode of diode 23 connected to the parallel circuit. The effect of diode 23 on partially filtered signal C is shown by line $V_z$ in FIG. 4.

A resistor 26 connects the anode of diode 23 to the base of a second NPN transistor 27 in filter 2. The emitter of transistor 27 is connected directly to B−whereas the collector of the transistor is wired to B′ through a load resistor 28. The substantially square wave intelligence output signal from filter 2 appears at the collector of transistor 27.

SQUARING AMPLIFIER

Squaring amplifier 3 squares and amplifies the essentially square wave intelligence output signal from filter 2. In the embodiment illustrated, a Schmitt trigger is used for this purpose, although it should be appreciated that any of the well-known types of squaring circuits may be used.

A resistor 30 serves as the input connecting squaring amplifier 3 to filter 2. Resistor 30 is connected between the base of an NPN transistor 31 and the collector of transistor 27. A load resistor 32 is connected between B' and the collector of transistor 31. The base of a second transistor 33 is also connected to the collector of transistor 31 through a resistor 34.

The emitters of transistors 31 and 33 are paralleled and then wired to B— through a resistor 35. The base of transistor 33 is also wired to B— through a resistor 36, whereas the collector of the transistor is connected to B' through a load resistor 37. Thus junction of resistor 37 and the collector of transistor 33 is designated as point D, the output of squaring amplifier 3 where square wave D of FIG. 4 appears.

POWER AMPLIFIER SWITCH

A power amplifier switch provides a high voltage, square wave for driving the synchronous motor. Switch 4 includes an NPN transistor 40 having its base connected to point D of squaring amplifier 3 through a resistor 41. A bias resistor 42 connects the base of the transistor to B—, with the emitter of the transistor being connected directly to B—. A load resistor connects the collector of transistor 40 to B+ which in the embodiment shown is plus 170 volts.

A second and third NPN transistor 44 and 45 are connected between B+ and the collector of transistor 40. The base of transistor 44 is connected directly to the collector of transistor 40. The collector of transistor 44 is connected to B+ whereas its emitter is connected directly to the base of transistor 45. The collector of transistor 45 is connected to B+ through a diode 46 whose anode is connected to the B+. The emitter of transistor 45 is wired back to the collector of transistor 40 through a diode 47, with the anode of the diode connected to transistor 45.

The junction of the anode of diode 47 and the emitter of transistor 45 is the output of switch 4, designated as point E, where the high square wave E of FIG. 4 appears.

DC SUPPLY

A DC supply 5 rectifies an AC line voltage supply of 110 volts AC, supplied to lines L1 and L2. Opposite facing diodes 52 and 53 are paralleled and connected to line L2. The cathode of diode 52 is connected to line L1 through a capacitor 54, defining a line 56 as the B+, or plus 170 volt, line. The anode of diode 53 is connected to line L1 through a capacitor 55 so as to define a line 57 as B— or minus 170 volts line. The line previously designated as B' is connected between line L1, also designated as common, and B— through a series circuit consisting of a resistor 58, a capacitor 59 and a second resistor 60.

MOTOR AND coupling

Coupling 6 in the preferred embodiment shown, for connecting winding 80 of synchronous motor 8 to the emitter of transistor 45, is by means of a coupling capacitor 61 having the value of 1 microfarad, and rated for 600 volts. This capacitor value is selected so as to resonate with winding 80 of motor 8 at the 60-cycle-per-second line frequency, which is the rated line frequency at which synchronous motors of the type used with such local controller circuits operate. In the embodiment shown, motor 8 is a single phase motor, of a well-known type, having magnet armature 81.

In this manner, motor 8 operates at substantially unity power factor over the operating range of frequencies, such range being 40 to 120 cycles per second, as previously outlined. Thus, the low-frequency power is limited to such value that motor 8 will not be destroyed by excessive power at these lower frequencies.

It should be appreciated that the value of capacitor 61 may be of any selected value so long as resonance is achieved with winding 80 of the particular synchronous motor 8 which may be used, such resonance occurring at the rated operating frequency of that motor, and such motor 8 operating at substantially unity power factor over the indicated range of frequencies.

MONITOR CIRCUIT

Monitor circuit 7 in the preferred embodiment shown, connects capacitor 61 to winding 80 of synchronous motor 8 as long as sufficient power is produced by the local controller circuit LC to normally energize a monitoring relay. If such power decreases below the energizing level of the monitoring relay, relay points transfer and power for operating motor 8 is drawn across lines L2 and COM, at a frequency of 60 cycles per second, which is the line frequency in the embodiment shown.

A series circuit of a resistor 71, an anode facing diode 72 and a capacitor 73 are wired from capacitor 61 to line COM, and it is interposed between capacitor 61 and winding 80. A monitoring relay coil 74 is connected from the junction of the cathode of diode 72 and capacitor 73 to line COM. Relay contacts 75, operative when coil 74 is energized, connect one end of winding 80 to line L2 by means of normally closed contact 76, when not operated by coil 74, and then to the junction of capacitor 61 and resistor 71 by means of normally open contact 77 when operated by coil 74.

OPERATION

With reference to FIGS. 3 and 4, local controller circuit LC is normally energized by lines L1 and L2 which in the embodiment shown is 115 volts, 60 cycles AC, and DC power supply 5 is supplying power to lines B+, B— and B'.

The input carrier signal, as shown by waveform A of FIG. 4, is of the type previously described, wherein a plurality of trains of mark-space pulses constitute the carrier signal, with the intelligence signal frequency dependent upon the duration of each mark and the time lapse between successive marks. This carrier signal is brought into sensing circuit 1 at input IN, and is impressed upon the base of transistor 13. As previously stated, sensing circuit 1 is an emitter follower, providing the necessary input impedance greater than 100 kilohms. The positive pulses of the carrier signal input signal are passed by transistor 13 so as to remove the AC component from such carrier signal, so as to produce a rectified carrier signal such as shown by waveform B of FIG. 4.

The rectified signal is impressed upon the first stage transistor 20 of filter 2. In this first stage the essentially square-wave intelligence envelope, as shown by waveform C, is separated from the rectified carrier signal Transistor 20 is forward biased by the positive voltage pulses of waveform B as shown in FIG. 4, charging capacitor 24 so as to produce the series of inverted spike pulses shown by waveform C of FIG. 4. The reference setting is Zener diode 23, rated at 16 volts, has a breakdown voltage such that only the essentially square-wave intelligence modulation of the prescribed frequency can feed through into the squaring amplifier 3. This breakdown voltage is illustrated by line $V_z$ on the indicated waveform C of FIG. 4.

The essentially square-wave intelligence envelope from filter 2 is impressed upon first stage transistor 31 of squaring amplifier 3. As previously detailed, squaring amplifier 3 is in the form of a Schmitt trigger, with the amplifier designed to provide a fast-switching square wave. The essentially square wave intelligence envelope, of the desired frequency within a given range, from filter 2 is squared, inverted and amplified by squaring amplifier 3, as shown by waveform D OF FIG. 4.

The amplified square wave from squaring amplifier 3 is impressed upon the input transistor 40 of power amplifier switch 4. Connected across amplifier switch 4 is the plus 170 and minus 170 volt sources from DC supply 5, and the amplified square wave from squaring amplifier 3 is used only as a switching voltage to amplify switch 4 to pass the large voltages, plus 170 and minus 170 volts, to the attached load. Thus, the transistors employed therein can be used to control several times their class A power rating. As waveform D (FIG. 4) goes positive, transistor 40 is forward biased into conduction, and minus 170 volts can then feed through negative facing diode 47 to the attached load. This negative voltage through transistor 40 also reverse biases the base of transistor 44 cutting off conduction in transistor 44 and thus removing any forward biasing base voltage to transistor 45. Therefore, the plus 170 volts on a positive facing diode 46 in the collector circuit of transistor 45 is blocked from being passed through transistor 45 to the attached load.

As waveform D (FIG. 4) goes negative, transistor 40 is reverse biased, cutting off conduction therein, and the minus 170 volts cannot now feed through the attached load. However, now the plus 170 volts, through resistor 43, can forward bias transistor 44 into conduction. When transistor 44 is so forward biased, a positive voltage is caused to forward bias transistor 45 into conduction. Now, with transistor 45 in conduction, the plus 170 volts from B+ can feed through diode 46 and transistor 45 to the attached load. In this manner, the larger voltages from DC supply 5, in the form of plus 170 and minus 170 volts is passed through power amplifier switch 4 to the attached load. This is shown by waveform E in FIG. 4.

However, if these large voltages were placed directly across winding 80, at the lower frequencies contemplated, winding 80 would burn up. Therefore, capacitor 61 is interposed between power amplifier switch 4 and winding 80 so as to limit the average current supplied to the winding, especially at the contemplated lower operating frequencies.

Capacitor 61 has a value that has been chosen so that it will resonate with winding 80, thus maintaining power supply to the motor fairly constant over the operating frequency range as previously outlined. The power factor for operating motor 8, will be substantially a unitypower factor, over the indicated range of frequencies.

The monitoring circuit 7 provides a safety measure for local controller LC. Coil 74 is normally energized through the series circuit of resistor 71, diode 72 and capacitor 73. When coil 74 is energized, normally open contacts 77 connect capacitor 61 to winding 80 via contact 75. Should a fault develop within the controller circuit, the normally energized relay coil 74 will become deenergized so as to transfer winding 80 through contacts 75 and 76 to line L2, having 60 cycles AC thereon.

In accordance with the preferred embodiment of the invention, the values of various components illustrated in FIG. 3 are found in table I.

TABLE I

| Component | Component Value or Type |
|---|---|
| Capacitor 11 | 0.01 microfarad |
| Resistor 12 | 33 kilohm |
| Transistor 13 | 3565 |
| Resistor 14 | 680 kilohm |
| Capacitor 15 | 0.02 microfarad |
| Resistor 16 | 15 kilohm |
| Resistor 17 | 15 kilohm |
| Capacitor 18 | 0.01 microfarad |
| Transistor 20 | 3565 |
| Resistor 21 | 10 kilohm |
| Resistor 22 | 4.7 kilohm |
| Zener Diode 23 | 16 volt |
| Resistor 25 | 22 kilohm |
| Resistor 26 | 1 kilohm |
| Transistor 27 | 3565 |
| Resistor 28 | 4.7 kilohm |
| Resistor 30 | 22 kilohm |
| Transistor 31 | 3565 |
| Resistor 32 | 4.7 kilohm |
| Transistor 33 | 3565 |
| Resistor 34 | 22 kilohm |
| Resistor 35 | 47 ohm |
| Resistor 36 | 33 kilohm |
| Resistor 37 | 1.5 kilohm |
| Resistor 41 | 3.9 kilohm |
| Resistor 42 | 680 kilohm |
| Resistor 43 | 22 kilohm, 2 watt |
| Diode 46 | IN 4005 |
| Diode 47 | IN 4005 |
| Diode 52 | IN 4005 |
| Diode 53 | IN 4005 |
| Capacitor 54 | 200 microfarad, 250 volt |
| Capacitor 55 | 200 microfarad, 250 volt |
| Resistor 58 | 5.1 kilohm, 2 watt |
| Capacitor 59 | 150 microfarad, 35 volt |
| Resistor 60 | 680 kilohm |
| Capacitor 61 | 1 microfarad, 600 volt |
| Resistor 71 | 2.2 kilohm |
| Diode 72 | IN 4005 |
| Capacitor 73 | 5 microfarad, 150 volt |

Although the invention has been shown in connection with a preferred embodiment, it will be readily apparent to those skilled in the art that various changes in form and arrangement of parts may be made to suit requirements without departing from the spirit and scope of the invention as defined by the appended claims.

I claim:

1. A control circuit comprising:

means for producing an essentially square wave signal of a frequency occuring within a range of frequencies defined by a lower frequency $F_1$ and an upper frequency $F_2$;

the winding of a synchronous motor coupled to said signal producing means, said motor being operative in response to a waveform of alternating polarity pulses of said frequency occurring within said frequency range; and a capacitor coupling said signal producing means to said synchronous motor winding, said capacitor passing said waveform of alternating polarity pulses to operate said synchronous motor in response to said produced signal of said frequency, whereby the average current impresses across, and hence, the power consumed by, said winding when so operating is limited by said capacitor so as to prevent the destruction of said winding at the low values of frequency occurring within said range, the low values being essentially of a frequency $F_1$, said signal-producing means including a nonlinear amplifying means, said amplifying means including a power switch means operative in response to said produced signal of said frequency;

said signal-producing means also including:

a sensing means responsive to a carrier signal input, said sensing means rectifying said carrier signal;

a filtering means responsive to said rectified carrier signal, said filtering means demodulating said rectified carrier signal so as to separate the modulating intelligence envelope therefrom, whereby the demodulated signal produced is an essentially square-wave intelligence envelope having said frequency.

2. A control circuit comprising:

input connections for receiving a carrier signal;

a sensing means responsive to said carrier signal input, said sensing means rectifying said carrier signal;

a filtering means responsive to said rectified carrier signal, said filtering means demodulating said rectified carrier signal so as to separate the modulating intelligence envelope therefrom, whereby the demodulated signal produced is an essentially square-wave intelligence envelope having said frequency;

a nonlinear amplifying means including a power switch means operative in response to said demodulated signal, an inductive load coupled to said power switch means, said inductive load being operative in response to a waveform of alternating polarity pulses of said envelope frequency.

3. The control circuit as set forth in claim 2 wherein said filtering means includes a Zener diode having a breakdown voltage such that only the essentially square-wave modulating intelligence envelope of said rectified carrier signal can feed therethrough.

4. The control circuit as set forth in claim 2 wherein said amplifying means also includes a wave squaring means responsive to said intelligence envelope signal, said wave squaring means producing an amplified square wave when so responsive so as to provide a fast-switching signal of said frequency to said amplifying means.

5. The control circuit as set forth in claim 4 wherein said carrier signal is a plurality of trains of mark-space pulses of said frequency, said mark and space portions being of equal time duration.

6. The control circuit as set forth in claim 5 wherein a monitoring circuit is connected to said capacitor and said motor winding, said monitoring circuit normally energizing a switching means, connected to said monitoring circuit, in the event the output power passed by said capacitor is maintained above a prescribed level, said switching means connecting said motor winding to said capacitor when said switching means is so energized.

7. In a motor control circuit of the type including a demodulator and an amplifier for demodulating a plurality of trains of mark-space pulses into a substantially square-wave intelligence signal of a frequency within a given range, with the intelligence signal frequency dependent upon the duration of each mark and the time lapse between successive marks and then amplifying said intelligence signal for application to a motor to cause operation of such motor, wherein the improvement comprises:
a capacitor coupling said amplifier to a winding of said motor so as to limit the average current passes by said capacitor to said motor winding whereby destruction of said motor winding is prevented at low values of said frequency of said intelligence signal occurring within said frequency range.

8. In a motor control circuit as set forth in claim 7 wherein said motor is a synchronous motor, and said capacitor having a value so that said motor operates at a substantially unity power factor within said range of frequencies.

9. In a traffic control system including a master controller having means for developing one of a plurality of cycle length determining frequency signals each of a different frequency in the range from a low frequency $F_1$ to a high frequency $F_2$ and at least one local controller for receiving said frequency signals, said local controller including a synchronous motor which times one traffic signal cycle for each revolution of the motor, the improvement in said local controller comprising:
means responsive to said frequency signal for providing an essentially square-wave signal of the same frequency, and
capacitor means coupling said square-wave signal means to a winding of a said motor in such a manner to limit the average current applied to said motor winding to prevent destruction of said motor windings at low frequencies approaching frequency $F_1$.

10. In a traffic control system as set forth square-wave claim 9 wherein said master controller has means for developing a mark-space train of carrier signals wherein the envelope of said train carrier signals exhibits the frequency of a desired cycle length determining signal, and said local controller further includes:
means for demodulating said carrier signal to obtain a signal exhibiting the frequency of said envelope, and
means for squaring said demodulated signal to develop a square wave signal of the same frequency.

11. In a traffic control system as set forth in claim 10 including power amplifier switching means for providing an amplified square-wave signal of the frequency of said envelope, said capacitor means directly coupling the output of said power amplifier switching means with said motor winding.

* * * * *